United States Patent
Fragelli et al.

[11] Patent Number: 6,103,101
[45] Date of Patent: *Aug. 15, 2000

[54] PROCESS FOR PRODUCING LUBE BASE OILS OF HIGH VISCOSITY INDEX AND DIESEL OIL OF HIGH CETANED NUMBER

[75] Inventors: Bruno Fragelli, Riode J.; Guilherme Luis Monteiro De Souza, Niterói, both of Brazil

[73] Assignee: Petroleo Brasileiro S.A.-Petrobras, Rio de Janeiro, Brazil

[ * ] Notice: This patent issued on a continued prosecution application filed under 37 CFR 1.53(d), and is subject to the twenty year patent term provisions of 35 U.S.C. 154(a)(2).

[21] Appl. No.: 08/871,729

[22] Filed: Jun. 9, 1997

Related U.S. Application Data

[63] Continuation of application No. 08/316,473, Oct. 3, 1994, abandoned.

[30] Foreign Application Priority Data

Oct. 1, 1993 [BR] Brazil ................................. 9303997

[51] Int. Cl.⁷ .................................................. C10G 69/02
[52] U.S. Cl. ................................ 208/89; 208/27; 208/60; 208/61; 208/95; 208/96
[58] Field of Search ................................ 208/27, 60, 61, 208/89, 95, 96

[56] References Cited

U.S. PATENT DOCUMENTS

| | | | |
|---|---|---|---|
| 3,438,887 | 4/1969 | Morris et al. | 208/28 |
| 3,539,495 | 11/1970 | Egan | 208/28 |
| 3,764,516 | 10/1973 | Steinmetz et al. | 208/89 |
| 3,912,620 | 10/1975 | Gallagher | 208/89 |
| 3,915,843 | 10/1975 | Franck et al. | 208/60 |
| 4,016,067 | 4/1977 | Fischer et al. | 208/89 |
| 4,247,388 | 1/1981 | Banta et al. | 208/111 |
| 4,414,097 | 11/1983 | Chester et al. | 208/61 |
| 4,508,615 | 4/1985 | Oleck et al. | 208/89 |
| 4,518,485 | 5/1985 | LaPierre et al. | 208/89 |
| 4,547,283 | 10/1985 | Neel et al. | 208/46 |
| 4,554,065 | 11/1985 | Albinson et al. | 208/89 |
| 4,734,539 | 3/1988 | Lawlor et al. | 585/739 |
| 5,098,551 | 3/1992 | Bertaux et al. | 208/27 |
| 5,198,099 | 3/1993 | Trachte et al. | 208/89 |
| 5,205,923 | 4/1993 | De Souza et al. | 208/27 |

FOREIGN PATENT DOCUMENTS

| 20321307 | 6/1989 | European Pat. Off. |
| WO 9201769 | 2/1992 | WIPO |

*Primary Examiner*—Walter D. Griffin
*Attorney, Agent, or Firm*—Sughrue, Mion, Zinn, Macpeak & Seas, PLLC

[57] ABSTRACT

A process is described for the hydroisomerization/hydrocracking of paraffinic streams to yield lube oils of viscosity index of at least 105 and pour point −6° C. or less, whereby a paraffinic feed which is enriched in iso-paraffins is submitted to hydrogenation in a bed made up of HDM, HDT, HDI/HCC and HDF catalysts, the product oil is separated by distilling the light fractions eventually present and dewaxed to remove the non-reacted high melting point paraffins. Equally considered is a variation in the process whereby diesel oil of high cetane number is produced by recirculating the 370° C.+ cut to the process feed.

12 Claims, 3 Drawing Sheets

PROCESS FOR PRODUCING LUBE BASE OILS OF HIGH VISCOSITY INDEX AND DIESEL OIL OF HIGH CETANED NUMBER

This is a Continuation of application Ser. No. 08/316,473 filed Oct. 3, 1994, now abandoned.

BACKGROUND OF THE INVENTION

1. Field of the Invention

The present invention relates to a process for producing lube base oils of high viscosity index by hydroisomerization and hydrocracking of paraffinic hydrocarbon streams. More specifically, the present invention relates to a process for hydroisomerizing/hydrocracking which leads to lube base oils of high viscosity index and low pour point by contacting a feed enriched in iso-paraffins with a catalytic bed made up of a hydrodemetallization catalyst (HDM), a hydrotreating catalyst (HDT), a hydroisomerization/hydrocracking catalyst (HDI/HCC) and a hydrofinishing catalyst (HDF) and further separation of the product obtained.

The present invention relates further to a process for producing high quality fuels from the same paraffinic hydrocarbon streams and same catalytic bed, by recycling the 370° C.+ cut to the process feed.

2. Prior Art

Present engines and machinery require that the feed used to produce lube oil be dewaxed to eliminate high molecular weight n-paraffins as well as slightly branched paraffins which increase the pour point as well as the cloud point of the oils. Thus, to obtain sufficiently low pour points, these waxes must be completely or partially eliminated. The removal of the waxy compounds from the lube oils can be made by solvent dewaxing or either by a catalytic process, this latter being the most economical approach, since it works by selectively cracking the longer n-paraffins as well as the mono-methyl-paraffins, to yield lower molecular weight products, the separation of some of these being possible by distillation.

Among the dewaxing catalysts one can cite the zeolitic aluminosilicates, the pore size of which allows the entrance of linear n-paraffins and some slightly branched paraffins (thereafter in the present specification called waxes), while other materials such as more branched paraffins and cycloaliphatic and aromatic compounds are excluded. Zeolites such as ZSM-5, ZSM-11, ZSM-12, ZSM-23 and ZSM-38 have been described as being adequate for the desired dewaxing. See for example U.S. Pat. Nos. 4,247,388 and 4,659,311. However, those catalysts are not useful for isomerizing highly paraffinic feeds, since the cracked products are of excessively low molecular weight. Thus, feeds of more than 80% by weight of n-paraffins and mono-methyl paraffins require another approach in order to produce lube oil in high yield and of low pour point.

Catalytic hydroisomerization is one of the possible ways of treating feeds of high paraffin content, the catalyst being a zeolite of intermediate pore as disclosed in U.S. Pat. No. 4,734,539 or in U.S. Pat. No. 4,518,485 wherein the dewaxing is effected through a first hydrotreating step in order to remove at least part of the sulfur and nitrogen compounds followed by contact of the feed with beta zeolite wherein the silica/alumina ratio is at least 30:1 and having a hydrogenation/dehydrogenation component, the n-paraffins being converted by isomerization.

U.S. Pat. No. 4,547,283 teaches a catalytic isomerization process from slack waxes (oily waxes produced by solvent dewaxing the bottoms of heavy distillate hydrocracking units) wherein the paraffin which has not been isomerized is recycled after a further solvent dewaxing process.

WO 92/01769 teaches an isomerization process for paraffinic feed aiming at producing a lube oil wherein the catalyst is an inorganic oxide molecular sieve of oval pores 1-D having a secondary axis between 4.2 Å and 4.8 Å and a main axis between 5.4 to 7.0 Å, and at least one metal of Group VIII of the Periodic Table. The catalyst comprises a silicoaluminophosphate molecular sieve of intermediate pore such as a ZSM-22, ZSM-23 or ZSM-35 zeolite and at least a Group VIII metal. It is alleged that the lube oil so obtained shows a high level of paraffins which causes a viscosity level which is low for its boiling range. These properties cause less attrition strength, less engine wear and higher fuel efficiency. Cold starts are better. Oil viscosity index (V.I.) is between 125 to 180 while the pour point (P.P.) is between −63° C. to −24° C. Since oil characteristics allow its use free of additives, there are less deposits which are harmful to the engine performance. Due to the high paraffin content of the oil, oxidation resistance is improved.

European EP 321307 uses an approach aiming at protecting the hydroisomerization catalyst through the previous removal of compounds such as sulfur, nitrogen and polynuclear aromatics by contacting with a typical hydrotreating catalyst of small pore diameter such as Co—Mo on alumina.

In the present invention, a hydrodemetallization catalyst is used, aiming at removing polynuclear aromatic compounds as well as asphaltenes, the pore size of which allows the easy access of the more bulky molecules to the active sites.

Besides, the feeds described in the literature are considered as noble ones since they generally stem from a gasoil hydrorefining process or either from aromatic extraction of distillates, these processes yielding paraffinic oils which when submitted to solvent dewaxing yield a noble paraffinic cut called slack wax as well as an oil which should be hydrofinished. The slack wax contains in its composition a high level of n-paraffins of high melting point which after separation and hydrofinishing are of high commercial worth.

Brazilian Application BR PI no 9003449 of the Applicant (now corresponding to U.S. Pat. No. 5,205,923 and hereby fully incorporated as reference) teaches that the withdrawal of color-forming compounds from macro- and microcrystalline waxes is effected by contacting same with a mixed bed made up of a hydrodemetallization catalyst and a hydrotreating catalyst, with extended times on stream and production of high commercial value waxes of high quality.

However, the cited literature does not describe nor suggests the system of mixed catalytic bed now presented as applied to the iso-paraffins-enriched feed of the present invention, the inventive bed being designed to yield lube base oils of high viscosity index as well as diesel oil of high cetane number.

The raw materials useful in the process of the present invention comprise streams from the processes employed for the production of lube base oils and macro- and microcrystalline waxes, the macro-crystalline waxes being generated from light neutral distillate (LN), medium neutral (MN) and heavy neutral (HN), while the microwaxes are generated from bright stock deasphalted oil (BS).

Basically, these processes comprise the vacuum distillation of atmospheric residues which yield several distillate streams (neutral oils) as well as solvent deasphalting of the vacuum residue yielding deasphalted oils which thereafter can be directed to an usual step of aromatic removal with solvents to yield raffinate streams which are then submitted to usual solvent dewaxing processes whereby are obtained dewaxed oils and slack waxes.

Sometimes neutral and deasphalted oils are first directed to usual processes for solvent dewaxing and the dewaxed oils are then submitted to usual processes of solvent aromatic extraction.

The slack wax which is a by-product of the solvent dewaxing processes is so called in view of the fact that it contains a certain amount of lube base oil occluded in the filter cake during the filtration step of the dewaxing processes (as can be seen through ASTM Methods no D-721 or D-3235). The oil occluded in this paraffin contains most of the aromatic and heteroatom compounds present in the slack wax.

Slack waxes can then be submitted to a further deoiling process whereby are separated from this stream the high melting point and high comercial value fractions—the hard waxes—and a stream of low commercial value—the soft waxes, which usually make up the feed of fluid catalytic cracking units (FCC).

The soft wax stream, if deprived of its lube fraction would still show a melting point which would be too low for such uses as candles, packing, etc. however not low enough for applications such as lubes and liquid fuels, which are among the applications sought by the present invention.

The hard waxes yielded by the conventional deoiling process (melting point higher than 46° C.) show a composition wherein 50 to 90% are n-paraffins while 10 to 40% are iso-paraffins. The soft waxes obtained in this same process show in their composition of from 20 to 80% of iso-paraffins the balance to 100% being n-paraffins based on the total paraffins, as illustrated below:

|  | n-Paraffin content | i-Paraffin content |
| --- | --- | --- |
| Hard wax from heavy neutral % | 66 | 34 |
| Soft wax from heavy neutral % | 31 | 69 |
| Slack wax from heavy neutral % | 38 | 62 |

As stated in EP 0464561, the slack wax from the dewaxing process can be separated in an initial stage into harder waxes which would then be the feed of the hydroisomerization process and a stream called "foots oil". In spite of the fact that this publication stresses the need to effect an initial deoiling as a way of removing from the raw material of the hydroisomerization process most of the aromatics and heteroatoms present in the feed (slack wax), this additional step represents additional investment and/or production costs, besides wasting a portion of the normal and iso-paraffins removed in the "foots oil".

Among other raw materials useful in the present invention are the soft macro- and micro crystalline waxes which constitute by-products of the usual process for the deoiling of slack waxes and petrolatums in which the main products are the commercial macro- and/or microcrystalline hard waxes. Most preferred are the soft waxes generated from the slack waxes yielded in conventional solvent dewaxing processes which comprise two or more filtration steps since these waxes show a lower content (zero to 10%) of occluded lube base oil as can be seen by applying ASTM Method D-721. Thus, the raw material called soft wax is made up of occluded lube base oil plus low melting point paraffin.

The choice of the soft waxes as the main raw material of the inventive process shows two advantages as compared to other raw materials: lower intrinsic worth in view of the absence, in this stream, of the higher melting point and high commercial value portion (that is, the hard waxes), thus reducing production costs, besides the fact that, as a natural consequence of its production processes, the soft wax stream is intrinsically enriched in iso-paraffins, this being advantageous in the hydroisomerization step.

However, the presence of lube base oil occluded in the soft wax requires for this feed a proper treatment in a catalytic bed in the presence of hydrogen in order to remove compounds such as asphaltenes, polynuclear aromatics, nitrogen, sulfur and oxygen, which are harmful to properties such as viscosity index, oxidation stability, etc.

Other raw materials adequate for the inventive process comprise slack waxes which originate from the dewaxing of raffinates and of atmospheric or vacuum distillates employed in the manufacturing of lube base oils, deoiled waxes known as hard waxes and which originate from these same distillates, petrolatums obtained from deasphalted residues, microcrystalline hard waxes, gasoils from atmospheric or vacuum distillation, raffinates from conventional processes for aromatic extraction from atmospheric or vacuum distillates and specially the so-called soft waxes which constitute the by-product of the usual deoiling of the macro- and microcrystalline slack waxes and petrolatums.

Therefore, one objective of the present invention is lube oils of high viscosity index and pour point −6° C. or less from iso-paraffins enriched feeds such as light neutral slack waxes LN, medium neutral MN, heavy neutral HN and bright stock BS, or soft waxes LN, MN and HN as well as microparaffins.

Another objective is a catalytic bed wherein the feed contacts successively a hydrodemetallization bed, a hydrotreating bed, a hydroisomerization/hydrocracking bed and optionally a hydrofinishing bed, whereby lube oils of outstanding characteristics are produced.

Still an objective is to obtain diesel oil of high cetane number, in the distillation range between 150 to 370° C., from the same feeds and catalytic bed used to make lube oil, by recycling to the process feed the 370° C.+ fraction.

An additional objective is to provide a process for producing lube base oils and diesel oil of high quality from paraffinic feeds of low cost and commercial catalysts, this representing great process savings.

SUMMARY OF THE INVENTION

Figure 1:
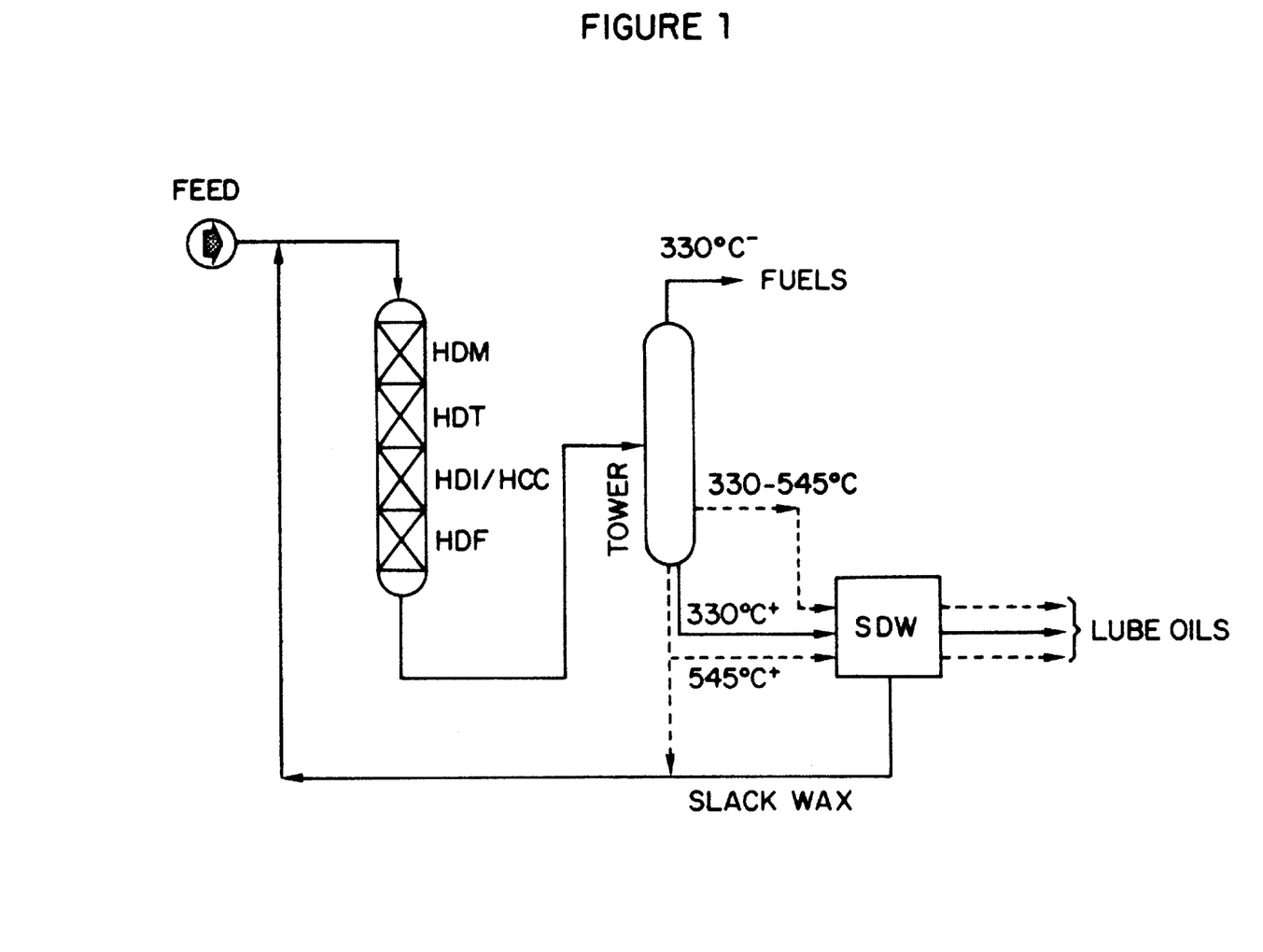
FIG. 1 is a simplified flowsheet of the inventive process in which is represented the reaction vessel containing in its interior the mixed catalytic bed comprising HDM, HDT, HDI/HCC and HDF catalysts which the feed contacts successively; then the product is distilled to yield diesel oil, naphtha and GLP while the 330° C.+ cut is solvent dewaxed with recovery and recycling of the respective slack wax to the process feed of the invention. In case the feed originates from a vacuum residue, it is convenient that in the distillation of the isomerized product the lube oils be separated by cuts in the ranges 330–545° C. and 545° C.+ in view of the lower V.I. reached by the 545° C.+ fraction. As represented by the dashed lines, the 545° C.+ cut may be dewaxed or recycled to the process feed. Another alternative (not shown in the Figure) refers to the several catalytic beds for HDM, HDT, HDI/HCC and HDF in separate reaction vessels, the feed which leaves one reaction vessel being directed to the following reaction vessel.
Figure 2:
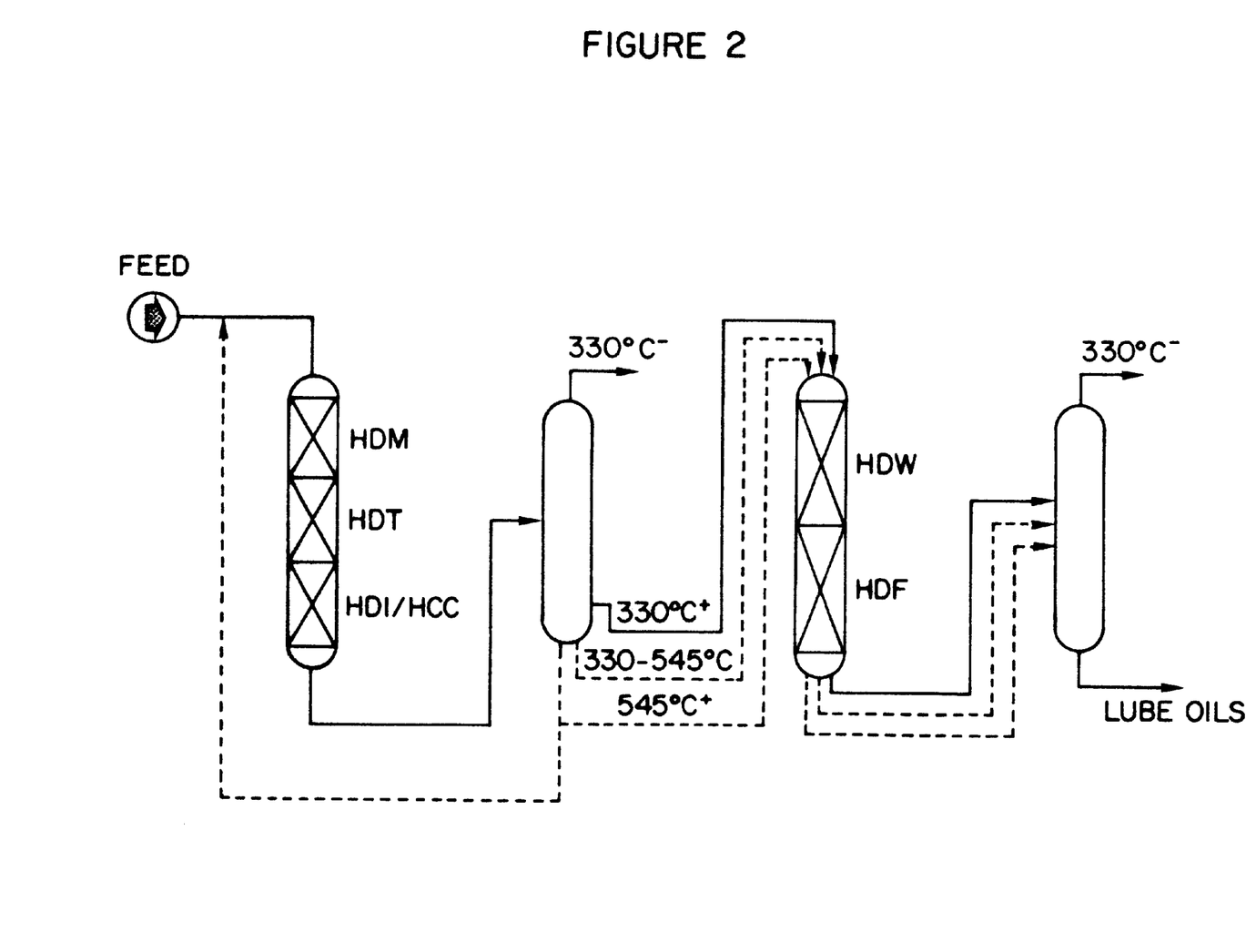
FIG. 2 represents an alternative concerning the catalytic dewaxing of the isomerized feedstock whereby the original feedstock is fed to a reaction vessel where it contacts a mixed catalytic bed made up of HDM, HDT and HDI/HCC catalysts; thereafter the product is distilled to yield fuels (330° C.−) while the 330° C.+ fraction enters a second reaction vessel where it contacts a second catalytic bed made up of hydrodewaxing (HDW) and hydrofinishing beds (HDF), the product being thereafter distilled again to yield fuels (330° C.− fractions) and lube base oil (330° C.+ fractions).
Figure 3:
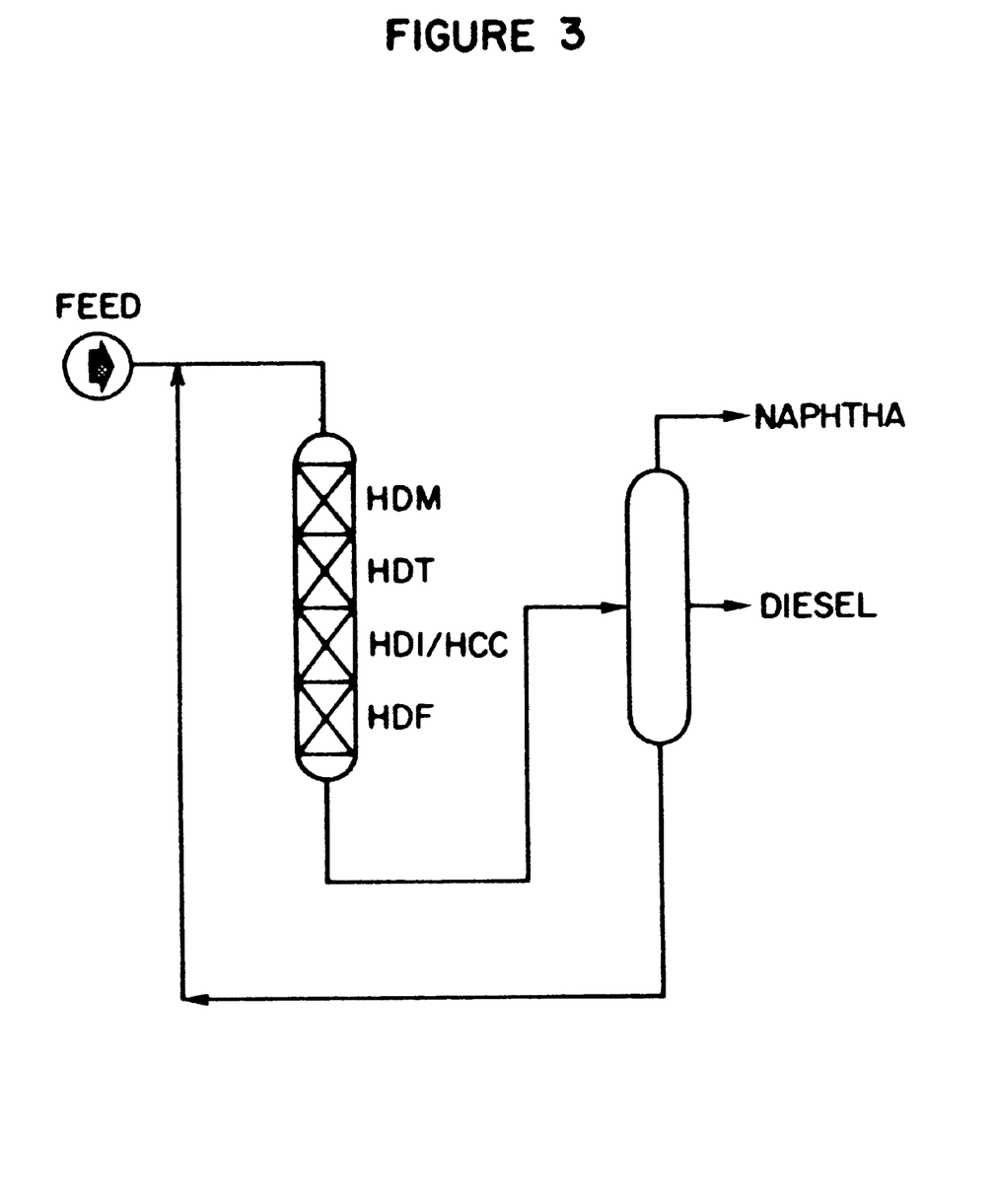
FIG. 3 is a process alternative designed to obtain fuels, wherein the process feedstock is fed to the reaction vessel where it contacts successively the catalyst beds for HDM, HDT, HDI/HCC and HDF; thereafter the product is distilled, to yield LPG, naphtha and diesel oil while the 370° C.+ cut is recycled to the process feed.

The present invention provides a hydroisomerization/hydrocracking process for producing lube oils of viscosity index (V.I.) higher than 105 and pour point −6° C. or less, by contacting a feed enriched in iso-paraffins with a mixed catalytic bed made up successively of a hydrodemetallization catalyst, a hydrotreating catalyst, a hydroisomerization/hydrocracking catalyst and optionally a hydrofinishing catalyst, whereby is produced high quality lube oil for engines and other applications, the oil requiring lower amounts of additive for its effective use. Besides, the inventive process leads to a lube base oil of low aromatic, sulfur and nitrogen compounds content, which makes it a product of reduced aggressiveness not only to the environment but also to the engines to which it is destined, besides its prolonged useful life.

The present invention provides equally a process which, from the same paraffinic feeds and catalytic bed, yields fuels in the range 150–370° C., chiefly diesel oil, of cetane number higher than 45.

BEST MODE

On the one hand, the inventive features of the present invention refer to the nature of the paraffinic feed employed, and on the other hand, to the catalytic bed specially adapted to the processing of the feed, the combined aspects leading to a process the characteristics of which are not suggested nor revealed by the state of the art. Thus, in its broadest aspect, the present invention comprises a feed enriched in iso-paraffins being submitted to a successive treatment on different catalyst types, each one designed to perform a specific task in each process step. In the preferred mode, the first catalyst with which the feed is contacted is the hydrodemetallization catalyst having large pores the main function of which is to convert compounds such as asphaltenes and polynuclear aromatics (PNA) present in the paraffinic feed, followed by a hydrotreating catalyst the main function of which is to reduce the content of sulfur, nitrogen and oxygen compounds, as well as of aromatics, followed by a catalyst the main function of which is to promote the paraffin isomerization as well as the cracking of naphthenic rings followed optionally by a hydrofinishing catalyst to confer better stability to the lube oil product, of viscosity index higher than 105 and pour point −6° C. or less. The weight amount of each catalyst in the bed is of from 5 to 25% of HDM catalyst, of from zero to 60% of HDT catalyst, of from 15 to 65% of HDI/HCC catalyst and of from zero and the balance of the HDF catalyst.

As equally seen in Brazilian Application 9003449 of the Applicant, in the present process catalytic beds where HDM and HDT catalysts are conjugated show higher efficiency in the removal of alphaltenes and polynuclear aromatics than the single HDT bed.

The paraffinic feed submitted to the catalytic treament which leads to the inventive lube oil can be varied, provided that it be rich in normal and iso-paraffins and be of low cost, as throroughly described hereinbefore.

In the preferred mode of the present invention, the feed comprises slack waxes such as light neutral (LN), medium neutral (MN), heavy neutral (HN) and bright stock (petrolatum), or soft waxes LN, MN, HN and microparaffins.

These feeds originate from a process scheme where the fractions obtained in the vacuum distillation of an atmospheric residue are hydrocracked or solvent extracted in order to remove or convert aromatics, the hydrocracked or raffinate consisting of LN, MN, HN and bright stock BS being solvent dewaxed to produce respectively slack waxes LN, MN, HN and BS, useful as paraffinic feeds of the present process for preparing lube oil of high viscosity index and low pour point and diesel oil of high cetane number. The present process employs equally as feed the soft waxes LN, MN, HN and BS which are obtained by solvent deoiling of the respective slack waxes.

Thus, a soft wax contains oil which has not been removed by the solvent dewaxing as well as low melting point paraffins, that is why they are called soft. The soft wax is characterized by a high iso-paraffin content, as compared to the hard paraffins as well as by the low cost, which is in contrast with the prior art which uses slack waxes of high starting cost, since they contain a fraction of hard paraffin of high melting point and therefore high intrinsic value.

The hydrodemetallization catalyst (HDM) which comprises of between 5 and 25% by weight of the total catalytic bed and with which the feed is initially contacted should contain of between zero and 14% by weight of Mo or either between zero and 14% by weight of W, between zero and 4% by weight of Ni, between zero and 4% by weight of Co and between zero and 3% by weight of P, the active phase being supported on alumina. Catalyst acidity, as expressed in milliequivalents of n-butylamine per gram of catalyst, should be between 0.2 and 1.0. The surface area, as determined by the BET Method should be between 100 to 400 $m^2/g$, the mean pore diameter as determined by the mercury intrusion method should be of 7.0 to 40.0 nm and the total pore volume should be of from 0.4 to 1.2 ml/g. The pore volume distribution in ml/g, as a function of the pore diameter should be comprised between the following ranges: 3.0<Vp<10 nm=0.1 to 0.6; 10<Vp<100 nm=0.1 to 0.8; 100<Vp<1000=0.0 to 0.15; 1000 nm<VP=0.0 to 0.1.

Thus, the pore structure of the HDM catalyst enables it to remove from the paraffinic feed those compounds such as asphaltenes and polinuclear aromatics which originate from the oily fraction which is part of the feed and which should be removed in order to obtain a stable end product.

Next, the bed is constituted, in a weight proportion of from zero to 60%, of a hydrotreating catalyst which can contain of from zero and 20 weight % of Mo or either of from zero and 26% by weight of W, of between zero and 8% by weight of Ni, of between zero and 8% by weight of Co and of between zero and 6% by weight of P, the active phase being supported on alumina. The catalyst acidity, as measured in milliequivalents of n-butylamine per gram of catalyst, should be between 0.4 to 1.4. Surface area, as determined by the BET method should be between 70 and up to 320 $m^2/g$, the average pore diameter as measured by the mercury intrusion method should be of from 5.0 to 20 nm while the total pore volume Vtp in ml/g should be of from 0.2 to 0.8. The pore volume distribution, in ml/g, as a function of the pore diameter should be comprised within the following ranges: 3.0<Vp<10 nm=0.1 to 0.6; 10<Vp<100 nm=0.0 to 0.6; 100 nm<Vp=0.0 to 0.1.

Thus, the use of a hydrotreating catalyst as a component of a reaction system such as $NiMo/Al_2O_3$ is due to the higher efficiency of these catalysts in lowering the contents of sulfur, nitrogen and oxygen compounds which, besides strongly contributing to the product stability, aims at preparing the feed to the following step, which is the hydroisomerization itself and the hydrocracking.

Then, the mixed catalytic bed of the invention is constituted by a hydroisomerizaton/hydrocracking catalyst which represents of from 15 to 65 weight % of the bed and which can be a zeolitic hydrocracking catalyst, a catalyst for aromatic saturation acidified by halogen, an amorphous alumina or halogenated alumina catalyst, or either a silica alumina catalyst or a silica alumina zeolite catalyst having noble or non-noble metals of Groups VI-B and/or VIII supported on it. In case a zeolite catalyst is used, this should contain of from zero to 14 weight % of Mo, of from zero to 26 weight % of W, of from zero to 6 weight % of Ni, of from zero to 6 weight % of Co, of from zero and 2 weight % of Ru, of from zero and 2 weight % of Rh, of from zero and 2 weight % of Os, of from zero and 2 weight % of Ir, of from zero and 2 weight % of Pt, of from zero and 2 weight % of Pd, and of from zero and 4 weight % of P, the active phase being supported on 26 to 45 weight % of Al, and of from 0.2 to 12 weight % of Si. Surface area as measured by the BET method should be of between 100 to 500 $m^2/g$, the average pore diameter as measured by the mercury intrusion method should be of between 3.0 to 30 nm, while the total pore volume should be of from 0.2 to 1.2 ml/g. The pore volume distribution in ml/g, as a function of the pore diameter, as measured by the intrusion mercury and nitrogen isotherm methods comprises the following ranges: Vp<3.0 nm=0.0 to 0.08; 3.0<Vp<10.0 nm=0.0 to 0.7 ; 10.0<Vp<100 nm=0.0 to 1.0; 100<Vp<1000 nm=0.0 to 0.2; 1000 nm<Vp=0.0 to 0.1. The crystallinity weight percentage of the zeolite contained in the catalyst should be between 1 and 25%, while the zeolite unit cell size should be between 2.435 and 2.455 nm.

Finally, the lube oil product which is obtained can be submitted to a hydrofinishing step to increase oil stability. The bed weight fraction taken by the hydrofinishing catalyst is between zero and the balance of the total bed, and the catalyst composition can be similar to that of the hydrotreating (HDT) catalyst described hereinbefore.

The hydroisomerization/hydrocracking process of the present invention is effected basically by contacting the soft wax or slack wax feeds with the mixed bed made up by HDM, HDT, HDI/HCC and HDF catalysts, at temperatures between 280 and 450° C., under pressures of between 40 to 230 $kgf/cm^2$, hourly space velocity of between 0.2 to 2.0 kg/kgxh, the ratio $H_2$/feed in $Nm^3/m^3$ being of between 100 and 1600.

Regarding the arrangement of the catalytic bed, the several beds can be placed successively in one single reaction vessel. Alternatively, depending on the commercial catalyst selected for the HDI/HCC step, it is possible to operate under milder conditions than in the HDM and HDT steps, in a separate reaction vessel, while using the previously specified ranges.

The optional hydrofinishing step is explained in terms of the need to saturate olefins and other impurities generated in the HDI/HCC catalyst bed; the operation conditions are mild: temperature between 280 and 380° C., pressure between 30 and 80 $kgf/cm^2g$, hourly space velocity between 0.5 to 4.0 $m^2/m^2h$ and $H_2$/feed ratio between 100 and 600 $Nm^3/m^3$. Although operating conditions can be different from those of the other beds, the hydrofinishing bed can be installed in the same reaction vessel where is effected the hydroisomerization process.

The process of the present invention comprehends further, after the contact of the paraffinic feed with the mixed catalytic bed, a distillation of the product so as to withdraw the naphtha and diesel fractions, so as to submit the paraffinic residue to a solvent dewaxing process to separate the slack wax which is then recycled to the first or third beds. Further, there is the possibility of using the usual catalytic dewaxing (HDW) with the paraffinic residue whereby the remaining n-paraffins are preferably cracked, and thereafter a new distillation is effected to separate LPG, naphtha, diesel oil and the lube base oil fraction is hydrofinished (HDF) to increase stability.

Note that the lube base oil process of the present invention yields of from 10 to 40% by volume of high cetane number diesel oil as a by-product, this being of interest for the refiner product slate. Further, as mentioned before, the present invention contemplates the production of fuels per se, chiefly of fuels in the diesel range, from the recycle of the 370° C.+ cut to the process feed.

Therefore, the hydroisomerization/hydrocracking process of the present invention can be characterized in that it comprises contacting a feed which is enriched in iso-paraffins with a catalytic bed which comprises a first bed, a second bed, a third bed and optionally a fourth bed, the beds being placed in a same reaction vessel or in different reaction vessels with or without a gas separation between the second and third reactors wherein the first bed comprises a hydrodemetallization catalyst, the second bed comprises a hydrotreating catalyst, the third bed comprises a hydroisomerization/hydrocracking catalyst and the optional fourth bed comprises a hydrofinishing catalyst, wherein the weight percentage of the hydrodemetallization catalyst is between 5 to 25% of the bed, the weight percentage of the hydrotreating catalyst is between zero and 60%, the weight percentage of the hydroisomerization/hydrocracking catalyst is between 15 and 65% and the remaining of the bed is the hydrofinishing catalyst, wherein hydrogen is fed to the catalyst bed together with the paraffinic feed, wherein the hydrodemetallization catalyst comprises of from zero to 14 weight % of Mo or between zero and 14 weight % of W, between zero and 4 weight % of Ni, between zero and 4 weight % of Co, and between zero and 3 weight % of P, the hydrotreating catalyst comprises between zero and 20 weight % of Mo or between zero and 26 weight % of W, between zero and 8 weight % of Ni, between zero and 8 weight % of Co and between zero and 6 weight % of P, the catalyst for hydroisomerization/hydrocracking comprises of between zero and 14 weight % of Mo or between zero and 26 weight % of W, between zero and 6 weight % of Ni, between zero and 6 weight % of Co, between zero and 2 weight % of Pt, between zero and 2 weight % of Pd, between zero and 2 weitht % of Ru, between zero and 2 weight % of Rh, between zero and 2 weight % of Os, between zero and 2 weight % of Ir and between zero and 4 weight % of P, the hydrofinishing catalyst can have the same chemical composition as the hydrotreating catalyst of the second bed, wherein the partially hydrofinished lube oil is submitted to a distillation to withdraw the light fractions and the product lube oil is solvent dewaxed or catalytically hydrodewaxed, whereby is produced a lube oil of viscosity index higher than 105 and pour point −6° C. or less.

Altenatively, in case the process is designed to obtain fuels, for example, fuels in the diesel range, the 370° C.+ cut which leaves the last catalytic bed is recirculated to the process feed, whereby high quality fuel in the diesel range is recovered.

The present invention will now be illustrated by the following examples which should not be considered as limiting.

EXAMPLE 1

In Example 1 as well as in Exmaple 2 the following commercial catalysts are employed:

The hydrodemetallization catalyst which makes up the portion of the bed with which the feed is initially contacted contains 7 weight % of Mo, 2.1 weight % of Ni and 1.4 weight % of P, the active phase being supported on alumina. The catalyst acidity as measured in milliequivalents of n-butylamine per gram of catalyst, is 0.42. The pore volume distribution in ml/g as a function of pore diameter and measured by the mercury intrusion method is the following: 3.0<Vp<10 nm=0.47; 10<Vp<100 nm=0.23; 100<Vp<1000 nm=0.12; 1000 nm<Vp=0.05. The average pore diameter is 9.8 nm, the total pore volume Vpt in ml/g is 0.87, the surface area as measured by the BET method is 300 m$^2$/g and the bulk density is 0.47 g/cm$^3$.

The hydrotreating catalyst is a catalyst which contains 14 weight % of Mo, 3.3 weight % of Ni and 3 weight % of P, the active phase being supported on gamma-alumina. The acitity as measured in milliequivalents of n-butylamine per gram of catalyst is 0.71. The catalyst pore volume distribution in ml/g, as a function of the pore diameter and measured by the mercury intrusion method is as follows: 3.0<Vp<10 nm=0.36; 10<Vp<100 nm=0.02. The average pore diameter is 8.7 nm, the total pore volume in ml/g is 0.38, the surface area by the BET method is 167 m$^2$/g and the bulk density is 0.86 g/cm$^2$.

The hydroisomerization/hydrocracking catalyst is a catalyst which contains 9.52 weight % of Mo, 2.59 weight % of Ni and 0.02 weight % of P, the active phase being supported on gamma-alumina and a zeolite. The catalyst pore volume distribution in ml/g, as a function of the pore diameter, as measured by the mercury intrusion method and nitrogen isotherms is as follows: Vp<3.0 nm=0.016; 3.0<Vp<10.0=0.335; 10<Vp<100 nm=0.247; 100<Vp<1000 nm=0.133; Vp>1000=0.015. The average pore diameter is 11.8 nm, the total pore volume Vpt is 0.746 ml/g, the surface area as measured by the BET method is 244 cm$^2$/g, the zeolite crystallinity is 5 weight % and the zeolite unit cell size in nm is 2.447.

An industrial feed from a solvent dewaxing process and made up of soft wax from heavy neutral as specified on Table 1 below, was submitted to the inventive process to yield a lube oil of V.I. higher than 105 and pour point −6° C. or less. The feed analysis indicated iso-paraffin content of 69.0% while the n-paraffins constituted 31.0%. The catalyst bed was made up of 20 weight % of the HDM catalyst referred to above based on NiMoP on alumina and 30 weight % of the bed was a catalyst for HCC based on NiMoP on alumina and a zeolite. One experiment was run with the bed at 335° C. and another one with the bed at 370° C. Operation pressure was 110 kgf/cm$^2$g.

Table 1 below lists the feed specification.

TABLE 1

| | |
|---|---|
| oil content (D-721), weight % | 35 |
| Sulfur, weight % | 0.91 |
| Basic nitrogen, ppm | 34 |
| Polynuclear aromatics, weight % | 1.8 |
| Aromatic carbon, % | 6.0 |
| n-paraffin content, % | 31 |
| iso-paraffin content, % | 69 |

The space velocity was 0.5 kg/kg.h and the H$_2$/feed ratio in Nm$^3$/m$^3$ was 941. At the exit of the catalyst mixed bed the product was distilled to withdraw the lighter fractions (naphtha and diesel) and the 330° C.+ cut was dewaxed to methyl iso butyl ketone (MIBK) to yield a lube oil the properties of which are listed on Table 2 below.

EXAMPLE 2

An industrial feed made up of Bright Stock slack wax (petrolatum) was submitted to the inventive process for lube oil. In this Example the bed was made up of 30 weight % of HDM catalyst and 70 weight % of HCC catalyst. The temperature of the mixed bed was 370° C. and the pressure was 110 kgf/cm$^2$g. The space velocity and the H$_2$/feed ratio were respectively 0.5 kg/kgxh and 941 Nm$^3$/m$^3$. The lube oil product was treated the same way as that of Example 1, that is, a distillation which yielded the 330–545° C. and 545° C.+ cuts and dewaxing to MIBK (methyl isobutyl ketone) of the 330–545° C. and 545° C.+ cuts. The properties of these oils are listed on Table 2 below.

For the sake of comparison Table 2 lists also the characteristics of the oils occluded in the slack waxes of heavy neutral and bright stock during the industrial dewaxing process to MIBK.

In view of the fact that the present invention equally yields oils of lower viscosities, Table 2 lists also the characteristics of oils occluded in waxes of light neutral and medium neutral. As can be seen from data of Table 2, there is a net improvement in the oils produced through the inventive process as compared to the oils occluded in the paraffins (during the dewaxing step) which make up part of the raw material of the inventive process.

TABLE 2

| | EXAMPLE 1 | | EXAMPLE 2 | |
|---|---|---|---|---|
| Reactor temperature, ° C. | 335 | 370 | 370 | 370 |
| Distillation cut, ° C. | 330+ | 330+ | 330–545 | 545+ |
| Viscosity at 40° C., cst | 56.68 | 39.1 | 28.88 | 288.0 |
| Viscosity at 100° C., cst | 8.068 | 6.546 | 5.381 | 24.22 |
| Viscosity Index | 110 | 120 | 122 | 106 |
| Density at 20/4° C. | 0.8707 | 0.8590 | 0.8630 | 0.8842 |
| Refractive index at 20° C. | 1.4807 | 1.4759 | 1.4785 | 1.4862 |
| Pour point, ° C. | −9 | −6 | −9 | |
| Aniline point, ° C. | — | 112.6 | — | |
| Sulfur, ppm | 500 | 75 | 133 | |
| Basic Nitrogen, ppm | <2 | <2 | 4 | |
| Carbon distribution, | | | | |
| Ca | 4.8 | 4.1 | 6.1 | |
| Cn | 26.4 | 23.3 | 24.1 | |
| Cp | 68.8 | 72.6 | 69.8 | |

| | OCCLUDED OIL LIGHT NEUTRAL | OCCLUDED OIL MEDIUM NEUTRAL |
|---|---|---|
| Viscosity at 40° C., cst | 28.40 | 34.23 |

TABLE 2-continued

| | | |
|---|---|---|
| Viscosity at 100° C., cst | 4.936 | 5.560 |
| Viscosity Index | 96 | 98 |
| Density at 20/4° C. | 0.8827 | — |
| Refractive index at 20° C. | 1.4890 | — |
| Pour point, ° C. | −6 | −6 |
| Aniline point, ° C. | 88.2 | 92.4 |
| Sulfur, ppm | 13500 | 13000 |
| Basic Nitrogen, ppm | 72 | 50 |
| Carbon distribution, | | |
| Ca | 10.9 | — |
| Cn | 24.1 | — |
| Cp | 65.0 | — |

| | OCCLUDED OIL HEAVY NEUTRAL | OCCLUDED OIL BRIGHT STOCK |
|---|---|---|
| Viscosity at 40° C., cst | 89.95 | 629.3 |
| Viscosity at 100° C., cst | 10.27 | 38.68 |
| Viscosity Index | 95 | 94 |
| Density at 20/4° C. | 0.8907 | 0.9087 |
| Refractive index at 20° C. | 1.4914 | 1.5028 |
| Pour point, ° C. | −3 | −3 |
| Aniline point, ° C. | 101.9 | 116.5 |
| Sulfur, ppm | 13500 | 18400 |
| Basic Nitrogen, ppm | 68 | 120 |
| Carbon distribution, | | |
| Ca | 8.9 | 10.9 |
| Cn | 21.7 | 21.1 |
| Cp | 69.4 | 68.0 |

Diesel fractions of distillation range between 150 and 330° C. obtained in Examples 1 and 2 were analyzed and their characteristics are listed on Table 3 below.

TABLE 3

| | EXAMPLE 1 | EXAMPLE 2 |
|---|---|---|
| Reactor temperature, ° C. | 370 | 370 |
| density at 20/4° C. | 0.8243 | 0.8136 |
| Kinematic viscosity (cst) | | |
| at 20° C. | 2.958 | 2.429 |
| at 40° C. | 2.110 | 1.709 |
| at 90° C. | 1.787 | 1.912 |
| sulfur, ppm w | 150 | 130 |
| Basic nitrogen, ppm w | <3 | <3 |
| Refractive index, 20° C. | 1.4577 | 1.4535 |
| aniline point, ° C. | 65.6 | 63.1 |
| Bromine point, g/100 g | <1 | <1 |
| Polynucl. arom., weight % | 1.38 | — |
| Ramsbottom carbon residue, (last 10%), weight % | 0.07 | 0.09 |
| Cetane number | 49.7 | 48.0 |

As can be seen from these data, the diesel fraction shows outstanding properties, as demonstrated by the extremely low sulfur, basic nitrogen and polynuclear aromatic contents, while the cetane number is quite high.

We claim:

1. A process for producing lube base oils of high viscosity index, wherein said process comprises:

contacting a feed enriched in iso-paraffins with a catalyst bed to produce a partially finished lube oil, wherein the catalyst bed comprises a first bed, optionally a second bed, a third bed and optionally a fourth bed, the beds being placed in the same reaction vessel or in different reaction vessels and, when the second bed is present, with or without a gas separation between the second and third beds, where the first bed comprises a hydrodemetallization catalyst, the optional second bed comprises a hydrotreating catalyst, the third bed comprises a catalyst for hydroisomerization/hydrocracking and the optional fourth bed comprises a hydrofinishing catalyst, where the weight percentage of the hydrodemetallization catalyst is between 5 and 25% based on the total catalyst weight, the weight percentage of the hydrotreating bed is between zero and 60% based on the total catalyst weight, the weight percentage of the hydroisomerization/hydrocracking bed is between 15 and 65% based on the total catalyst weight and the remainder of the bed is the hydrofinishing catalyst, where hydrogen is fed to the catalyst bed together with the feed enriched in iso-paraffins, where the hydrodemetallization catalyst comprises between zero and 14 weight % of Mo or between zero and 14 weight % of W, between zero and 4 weight % of Ni, between zero and 4 weight % of Co and between greater than zero and 3 weight % of P, the hydrotreating catalyst comprises between zero and 20 weight % of Mo or between zero and 26 weight % of W, between zero and 8.0 weight % of Ni, between zero and 8 weight % of Co and between greater than zero and 6 weight % of P, the catalyst for hydroisomerization/hydrocracking comprises between zero and 14 weight % of Mo, or between zero and 14 weight % of W, between zero and 6 weight % Ni, between zero and 2 weight % of Pt, between zero and 2 weight % of Pd, between zero and 2 weight % of Ru, between zero and 2 weight % of Rh, between zero and 2 weight % of Os, between zero and 2 weight % of Ir, and between greater than zero and 4 weight % of P, wherein each catalyst has an active phase which is supported on alumina, halogenated alumina, or amorphous or crystalline silica-alumina and the hydrofinishing catalyst can have the same chemical composition as the hydrotreating catalyst of the second bed, wherein each catalyst contains at least some catalytic metal in a catalytically effective amount, distilling the partially finished lube oil to produce a product oil, and solvent dewaxing the product oil to produce a lube oil with a viscosity index of higher than 105 and a pour point of −6° C. or less, wherein the contacting of the feed enriched in iso-paraffins in the successive catalyst beds is effected at temperatures between 280 and 450° C., under hydrogen pressure between 40 and 230 kgf/cm$^2$g, where the hydrogen to paraffin feed ratio is between 100 and 1600 Nm$^3$/m$^3$ and where the weight hourly space velocity during the contact is between 0.1 and 2.0 kg/kg.h, wherein the feed enriched in iso-paraffins submitted to the hydroisomerization/hydrocracking process contains between 20 to 80% of iso-paraffins based on the total paraffin content.

2. A process as in claim 1, wherein the solvent dewaxing step comprises contacting the product oil with C3–C6 ketones, C6–C10 aromatic hydrocarbons and mixtures of C3–C6 ketones with C6–C10 aromatic hydrocarbons.

3. A process for producing lube base oils of high viscosity index, wherein said process comprises:

contacting a feed enriched in iso-paraffins with a catalyst bed to produce a resultant, wherein the catalyst bed comprises a first bed, optionally a second bed and a third bed, the beds being placed in the same reaction vessel or in different reaction vessels and, when the second bed is present, with or without a gas separation between the second and third beds, where the first bed comprises a hydrodemetallization catalyst, the optional second bed comprises a hydrotreating catalyst, the third bed comprises a catalyst for hydroisomerization/hydrocracking, where the weight percentage of the hydrodemetallization catalyst is between 5 and 25% based on the total catalyst weight, the weight percentage of the hydrotreating bed is between zero and 60% based on the total catalyst weight, and the weight percentage of the hydroisomerization/hydrocracking catalyst is between 15 and 75% based on the total catalyst weight, where hydrogen is fed to the catalyst bed together with the feed enriched in iso-paraffins, where the hydrodemetallization catalyst comprises between zero and 14 weight % of Mo or between zero and 14 weight % of W, between zero and 4 weight % of Ni, between zero and 4 weight % of Co, and between greater than zero and 3 weight % of P, the hydrotreating catalyst comprises between zero and 20 weight % of Mo or between zero and 26 weight % of W, between zero and 8.0 weight % of Ni, between zero and 8 weight % of Co and between greater than zero and 6 weight % of P, the catalyst for hydroisomerization/hydrocracking comprises between zero and 14 weight % of Mo, or between zero and 14 weight % of W, between zero and 6 weight % of Ni, between zero and 2 weight % of Pt, between zero and 2 weight % of Pd, between zero and 2 weight % of Ru, between zero and 2 weight % of Rh, between zero and 2 weight % of Os, between zero and 2 weight % of Ir, and between greater than zero and 4 weight % of P, wherein each catalyst has an active phase being supported on alumina, halogenated alumina, or amorphous or crystalline silica-alumina, wherein each catalyst contains at least some catalytic metal in a catalytically effective amount, distilling the resultant to provide a residue, catalytically dewaxing the residue to provide a catalytically dewaxed residue, hydrofinishing the catalytically dewaxed residue with a hydrofinishing catalyst to provide a hydrofinished composition, and distilling the hydrofinished composition to produce a lube oil with a viscosity index of higher than 105 and a pour point of −6° C. or less, wherein the contacting of the feed enriched in iso-paraffins in the successive catalyst beds is effected at temperatures between 280 and 450° C., under hydrogen pressure between 40 and 230 kgf/cm$^2$g, where the hydrogen to paraffin feed ratio is between 100 and 1600 Nm$^3$/m$^3$ and where the weight hourly space velocity during the contact is between 0.1 and 2.0 kg/kg.h, wherein the feed enriched in iso-paraffins submitted to the hydroisomerization/hydrocracking process contains between 20 to 80% of iso-paraffins based on the total paraffin content.

4. A process according to claim 3, wherein the catalytic dewaxing step is conducted in the presence of hydrogen at temperatures in the range of 270° C. to 450° C., pressure between 50 and 230 kgf/cm$^2$g, LHSV between 0.1 and 10 h$^{-1}$ and hydrogen/feed ratio between 100 and 3000 Nm$^3$/m$^3$.

5. A process according to claim 1 or 3, wherein said process further provides liquid fuels in the range of IBP-370° C. in an amount of from 10 to 40 volume % based on the total volume of products.

6. A process for producing a diesel oil of high cetane number, wherein said process comprises:

contacting a feed enriched in iso-paraffins with a catalyst bed to produce a resultant, wherein the catalyst bed comprises a first bed, optionally a second bed, and a third bed and optionally a fourth bed, the beds being placed in the same reaction vessel or in different reaction vessels and, when the second bed is present, with or without a gas separation between the second and third beds, where the first bed comprises a hydrodemetallization catalyst, the optional second bed comprises a hydrotreating catalyst, the third bed comprises a catalyst for hydroisomerization/hydrocracking and the optional fourth bed comprises a hydrofinishing catalyst, where the weight percentage of the hydrodemetallization catalyst is between 5 and 25% based on the total catalyst weight, the weight percentage of the hydrotreating bed is between zero and 60% based on the total catalyst weight, the weight percentage of the hydroisomerization/hydrocracking catalyst is between 15 and 65% based on the total catalyst weight and the remainder of the bed is the hydrofinishing catalyst, where hydrogen is fed to the catalyst bed together with the feed enriched in iso-paraffins, where the hydrodemetallization catalyst comprises between zero and 14 weight % of Mo or between zero and 14 weight % of W, between zero and 4 weight % of Ni, between zero and 4 weight % of Co, and between greater than zero and 3 weight % of P, the hydrotreating catalyst comprises between zero and 20 weight % of Mo or between zero and 26 weight % of W, between zero and 8.0 weight of Ni, between zero and 8 weight % of Co and between greater than zero and 6 weight % of P, the catalyst for hydroisomerization/hydrocracking comprises between zero and 14 weight % of Mo, or between zero and 14 weight % of W, between zero and 6 weight % of Ni, between zero and 2 weight % of Pt, between zero and 2 weight % of Pd, between zero and 2 weight % of Ru, between zero and 2 weight % of Rh, between zero and 2 weight % of Os, between zero and 2 weight % of Ir, and between greater than zero and 4 weight % of P, the active phase of the catalyst for hydroisomerization/hydrocracking being supported on alumina, halogenated alumina, or amorphous or crystalline silica-alumina and the hydrofinishing catalyst can have the same chemical composition as the hydrotreating catalyst of the second bed, wherein each catalyst contains at least some catalytic metal in a catalytically effective amount, distilling the resultant to provide a 370° C.+ fraction and diesel oil in a distillation range of 150–370° C. having a cetane number of 45 or higher, recirculating the 370° C.+ fraction to the feed, and providing the diesel oil in a distillation range of 150–370° C. having a cetane number of 45 or higher as a product, wherein the contacting of the feed enriched in iso-paraffins in the successive catalyst beds is effected at temperatures between 280 and 450° C., under hydrogen pressure between 40 and 230 kgf/cm$^2$g, where the hydrogen to paraffin feed ratio is between 100 and 1600 Nm$^3$/m$^3$ and where the weight hourly space velocity during the contact is between 0.1 and 2.0 kg/kg.h, wherein the feed enriched in iso-paraffins submitted to the hydroisomerization/hydrocracking process contains between 20 to 80% of iso-paraffins based on the total paraffin content.

7. A process according to claim 1, 3 or 6, wherein the contacting of the feed enriched in iso-paraffins in the successive catalyst beds is effected at temperatures between 320 and 390° C., under hydrogen pressure between 100 and 120 kgf/cm$^2$g, where the hydrogen to paraffinic feed ratio is between 700 and 900 Nm$^3$/m$^3$ and where the hourly space velocity during the contact is between 0.3 and 0.7 kg/kg.h.

8. A process according to claim 1, 3 or 6, wherein the hydrodemetallization catalyst is supported on alumina, the acidity of the hydrodemetallization catalyst is in the range of from 0.2 to 1.0 milliequivalents of n-butylamine per gram of catalyst, the BET surface area of the hydrodemetallization catalyst is in the range between 150 and 400 m$^2$/g, the average pore diameter of the hydrodemetallization catalyst is between 7.0 and 40 nm, the total pore volume of the hydrodemetallization catalyst in ml/g is between 0.4 and 1.2 and the distribution of pore volume Vp as a function of pore diameter of the hydrodemetallization catalyst is 3.0<Vp<10 nm=0.1 to 0.6 ml/g; 10<Vp<100 nm=0.1 to 0.8 ml/g; 100<Vp<1000=0.0 to 0.15 ml/g and 1000 nm<Vp=0.0 to 0.1 ml/g; the hydrotreating catalyst is supported on alumina, the acidity of the hydrotreating catalyst is between 0.4 to 1.4 milliequivalents of n-butylamine per gram of catalyst, the BET surface area of the hydrotreating catalyst is between 70 and 320 m$^2$/g, the average pore diameter of the hydrotreating catalyst is between 5.0 and 20 nm, the total pore volume of the hydrotreating catalyst in ml/g is between 0.2 and 0.6, and the distribution of the pore volume Vp as a function of pore diameter of the hydrotreating catalyst is in the range 3.0<Vp<10 nm=0.1 to 0.6 ml/g; 10<Vp<100 nm=0.0 to 0.6 ml/g; 100 nm<Vp=0.0 to 0.1 ml/g; the hydroisomerization/hydrocracking catalyst is a halogen-acidified catalyst for the saturation of aromatics, an amorphous alumina or halogenated alumina catalyst, or a silica-alumina catalyst, or a zeolite catalyst compounded with an active matrix, of surface area between 100 and 500 m$^2$/g, the average pore diameter as measured by the mercury intrusion method is between 3.0 to 30 nm, and the total pore volume is between 0.2 to 1.2 ml/g, the distribution of the pore volume Vp, as a function of the pore diameter, as measured by the methods of mercury intrusion and nitrogen isotherms comprises the following ranges: Vp<3.0 nm=0.0 to 0.08 g; 3.0<Vp<10.0 nm=0.0 to 0.7 ml/g; 10.0<Vp<100 nm=0.0 to 1.0 ml/g; 100<Vp<1000 nm=0.0 to 0.2 ml/g; and 1000 nm<Vp=0.0 to 0.1 ml/g, the weight per cent crystallinity of the zeolite contained in the catalyst being between 1 and 25% and the zeolite unit cell size being between 2.435 and 2.455 nm; and a hydrofinishing catalyst, if present, can have the same chemical composition as the hydrotreating catalyst.

9. A process according to claim 1, 3 or 6, wherein the hydrodemetallization catalyst contains 7.0 weight % of Mo, 2.1 weight % of Ni and 1.4 weight % of P and is supported on alumina, wherein the alumina is gamma-alumina, the hydrotreating catalyst contains 14 weight % of Mo, 3.3 weight % of Ni and 3.0 weight % of P and is supported on alumina, wherein the alumina is gamma-alumina, the catalyst for hydroisomerization/hydrocracking is a zeolite catalyst which contains 9.52 weight % of Mo, 2.59 weight % of Ni, 0.02 weight % of P, wherein the zeolite catalyst has an active phase which is supported on 2.3 weight % of silica and 40.78 weight % of Al, with surface area of 244 m$^2$/g, the average pore diameter is 11.8 nm, the total pore volume is 0.746 ml/g, the distribution of the pore volume Vp, as a function of the pore diameter, in ml/g is Vp<3.0 nm=0.016 ml/g; 3.0<Vp<10.0 nm=0.335 ml/g; 10<Vp 100 nm=0.247 ml/g; 100<Vp<1000 nm=0.133 ml/g; Vp>1000 nm=0.015 ml/g; the zeolite crystallinity in weight percent is 5; the zeolite unit cell size is 2.447 nm and a hydrofinishing catalyst, whenever present, can have the same chemical composition as the hydrotreating catalyst.

10. A process according to claim 1, 3 or 6, wherein a hydrofinishing catalyst is present in the catalyst bed, wherein the weight amount of each catalyst in the bed is 18 to 22% for the hydrodemetallization catalyst, 30 to 40% for the hydrotreating catalyst, 25 to 30% for the hydroisomerization/hydrocracking catalyst, and the remainder being the hydrofinishing catalyst, such that the amount of the hydrodemetallization catalyst, the hydrotreating catalyst, the hydroisomerization/hydrocracking catalyst, and the hydrofinishing catalyst adds up to 100%.

11. A process according to claim 1, 3 or 6, wherein the weight amount of each catalyst in the bed is 28–32% for the hydrodemetallization catalyst and 72–68% for the hydroisomerization/hydrocracking catalyst.

12. A process according to claim 1, 3 or 6, wherein the feed enriched in iso-paraffins submitted to the hydroisomerization/hydrocracking comprises (1) macro- and microcrystalline hard waxes obtained via a deoiling process, (2) slack waxes from solvent dewaxing of raffinate or distillate streams, (3) soft waxes, which are by-products of a deoiling of macro- and microcrystalline slack waxes, (4) raffinates from the extraction of aromatics from atmospheric or vacuum cuts or (5) gasoils from atmospheric or vacuum distillation.

* * * * *